United States Patent
Kang et al.

(10) Patent No.: US 11,664,012 B2
(45) Date of Patent: May 30, 2023

(54) ON-DEVICE SELF TRAINING IN A TWO-STAGE WAKEUP SYSTEM COMPRISING A SYSTEM ON CHIP WHICH OPERATES IN A REDUCED-ACTIVITY MODE

(71) Applicant: Qualcomm Incorporated, San Diego, CA (US)

(72) Inventors: Young Mo Kang, Redwood City, CA (US); Sungrack Yun, Seongnam-si (KR); Kyu Woong Hwang, Daejeon (KR); Hye Jin Jang, Seoul (KR); Byeonggeun Kim, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 189 days.

(21) Appl. No.: 16/830,029

(22) Filed: Mar. 25, 2020

(65) Prior Publication Data

US 2021/0304734 A1   Sep. 30, 2021

(51) Int. Cl.
| | |
|---|---|
| G10L 15/08 | (2006.01) |
| G10L 15/22 | (2006.01) |
| G10L 25/27 | (2013.01) |
| G10L 15/32 | (2013.01) |
| G06F 15/78 | (2006.01) |
| G10L 15/26 | (2006.01) |

(52) U.S. Cl.
CPC .......... *G10L 15/08* (2013.01); *G06F 15/7807* (2013.01); *G10L 15/26* (2013.01); *G10L 15/32* (2013.01); *G10L 2015/088* (2013.01)

(58) Field of Classification Search
CPC .. G10L 15/22; G10L 15/1822; G10L 21/0206; G10L 25/27; G06N 3/08; G06F 3/165; G06F 1/3206
USPC ........................................................ 704/260
See application file for complete search history.

(56) References Cited

U.S. PATENT DOCUMENTS

| | | | | |
|---|---|---|---|---|
| 9,892,726 | B1* | 2/2018 | Garimella | G10L 25/27 |
| 10,074,364 | B1* | 9/2018 | Wightman | G10L 15/20 |
| 10,381,001 | B2* | 8/2019 | Gunn | G06F 3/167 |
| 10,521,185 | B1* | 12/2019 | Kim | H04R 3/00 |
| 11,232,788 | B2* | 1/2022 | Yavagal | G10L 17/08 |
| 2012/0047172 | A1* | 2/2012 | Ponte | G06F 40/45 |
| | | | | 707/E17.022 |
| 2020/0244788 | A1* | 7/2020 | Adams | H04M 1/271 |

* cited by examiner

*Primary Examiner* — Farzad Kazeminezhad
(74) *Attorney, Agent, or Firm* — Edward J. Meisarosh

(57) ABSTRACT

In one embodiment, an electronic device includes an input device configured to provide an input stream, a first processing device, and a second processing device. The first processing device is configured to use a keyword-detection model to determine if the input stream comprises a keyword, wake up the second processing device in response to determining that a segment of the input stream comprises the keyword, and modify the keyword-detection model in response to a training input received from the second processing device. The second processing device is configured to use a first neural network to determine whether the segment of the input stream comprises the keyword and provide the training input to the first processing device in response to determining that the segment of the input stream does not comprise the keyword.

18 Claims, 4 Drawing Sheets

ON-DEVICE SELF TRAINING IN A TWO-STAGE WAKEUP SYSTEM COMPRISING A SYSTEM ON CHIP WHICH OPERATES IN A REDUCED-ACTIVITY MODE

FIELD OF THE DISCLOSURE

The present disclosure generally relates to wakeup systems and, particularly, to two-stage wakeup systems.

DESCRIPTION OF RELATED ART

Voice-based user interfaces (UIs) in consumer electronic devices allow users of the electronic devices—e.g., smartphones, smart watches, Internet of Things (IoT) devices, etc.—to interact with those devices by using voiced commands. Some examples of voice-based UIs include Siri from Apple Inc. of Cupertino, Calif., Alexa from Amazon.com, Inc. of Seattle, Wash., and Google Assistant from Google LLC of Mountain View, Calif.

While activated, a voice-based UI monitors its audio environment for voice commands. Typically, a voice command is prefixed with a keyword, such as, for example, "Hey, Siri," "Alexa," or "OK Google," which alerts the voice-based UI that a command is about to be provided. This enables the voice-based UI to avoid processing and parsing every detected utterance for a potential command and, instead, enables the UI to focus on utterances preceded by the appropriate keyword and ignore other spoken sounds and various background sounds. Once the UI detects a keyword, the UI then forwards a snippet comprising the presumed command to an automatic speech-recognition (ASR) system to decode the command and execute it.

Automatic speech recognition is a relatively resource-heavy task. Accordingly, the ASR system is typically implemented as a cloud-based server service, not on the electronic device implementing the voice-based UI. ASR systems typically implement an artificial neural network for the recognition of the spoken command and the response to the determined command.

As noted above, voice-based UIs may be implemented on mobile devices and other devices with relatively limited power supplies. Such devices have power and performance constraints that are more restrictive than desktop or server devices because they are more compact, may be powered by a portable power source such as batteries, and may have reduce heat dissipation capabilities. Accordingly, systems and methods that reduce the power used by voice-based UIs or increase the efficiency of voice-based UIs would be useful.

SUMMARY

Certain aspects of the present disclosure are directed to an electronic device comprising: a first processing device and a second processing device. The first processing device is configured to use a keyword-detection model to determine if a segment of an input stream comprises a keyword, wake up the second processing device in response to determining that a segment of the input stream comprises the keyword, and modify the keyword-detection model in response to receiving a training input from the second processing device. The second processing device is configured to use a first neural network to determine whether the segment of the input stream comprises the keyword, and provide the training input to the first processing device in response to determining that the segment of the input stream does not comprise the keyword.

Certain aspects of the present disclosure are directed to a method for an electronic device comprising a first processing device and a second processing device. The method comprises: receiving, at the first processing device, an input stream from the input device, using a keyword-detection model, by the first processing device, to determine if a segment of the input stream comprises a keyword, waking up the second processing device, by the first processing device, in response to determining that the segment of the input stream comprises the keyword, using a first neural network, by the second processing device, to determine whether the segment of the input stream comprises the keyword, providing, by the second processing device, a training input to the first processing device in response to determining that the segment of the input stream does not comprise the keyword, and modifying, by the first processing device, the keyword-detection model in response to receiving the training input.

Certain aspects of the present disclosure are directed to a non-transitory computer-readable medium comprising instructions that, when executed by at least one processor, cause the processor to perform operations for: receiving, at the first processing device, an input stream, using a keyword-detection model, by the first processing device, to determine if a segment of the input stream comprises a keyword, waking up the second processing device, by the first processing device, in response to determining that the segment of the input stream comprises the keyword, using a first neural network, by the second processing device, to determine whether the segment of the input stream comprises the keyword, providing, by the second processing device, a training input to the first processing device in response to determining that the segment of the input stream does not comprise the keyword, and modifying, by the first processing device, the keyword-detection model in response to receiving the training input.

Accordingly, in one embodiment, a method tunes a low-power first stage module using the output differences between the first stage module and high power second stage module. In another embodiment, a system for two-stage voice-based UI, e.g. on-device keyword spotting and on-device ASR, is configured to use the above-described method. In another embodiment, a non-transitory computer-readable medium comprises instructions that, when executed by at least one processor, cause the processor to perform operations for processing information from human voice in accordance with the above-described method.

Additional aspects, advantages, and features of the present disclosure may become apparent after review of the entire application.

DETAILED DESCRIPTION

With reference to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

In order to reduce power usage, some voice-based UI systems use a two-stage wakeup system to reduce overall power usage. In a multi-stage wakeup system, a lower-power and simpler, but lower-accuracy, component continuously monitors the audio environment for a keyword while a higher-power, more-complex, and higher-accuracy component sleeps. If the lower-power component determines that the keyword has been spoken, then it wakes up the higher-power component to confirm the determination and perform further processing.

Figure 1:
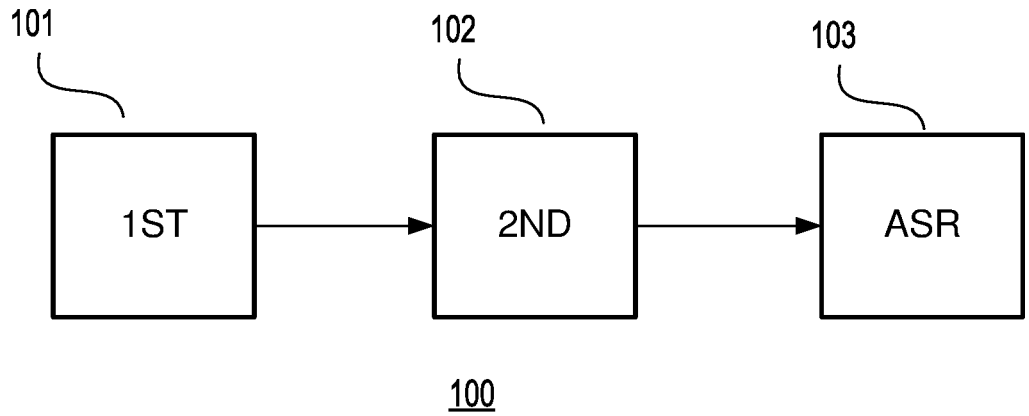
FIG. 1 is a schematic diagram for a typical two-stage wakeup system.

FIG. 1 is a schematic diagram for a typical two-stage wakeup system 100. The two-stage wakeup system 100 comprises a first stage 101, a second stage 102, and an automatic speech recognition (ASR) stage 103. The first stage 101 may be implemented by a low-power—and, relatedly, relatively low-accuracy—"always on" processor that "listens" (e.g., processes ambient audio picked up by a corresponding microphone) for a keyword while the second stage 102 "sleeps" (e.g., is in a very-low-power mode that allows for a relatively rapid wakeup). If the first stage 101 detects the keyword, then the first stage 101 "wakes up" the second stage 102 and passes on to the second stage 102 the triggering audio data for confirmation and further processing.

Note that the ambient audio may be processed to generate a raw waveform that, in turn, may be processed by computing a short time Fourier transform (STFT) with a given hop size from the raw waveform. The resulting spectrogram may be a tridimensional arrangement that shows frequency distribution and intensity of the audio as a function of time. Additional processing may include "stretching" lower frequencies in order to approximate human perception, which is less sensitive to changes in higher frequencies. This can be done by computing mel-frequency coefficients (MFCs) for the audio. The term "audio data" as used herein may correspond to, for example, the raw waveform, the corresponding spectrogram, and/or the corresponding MFCs.

The second stage 102 may be implemented by an application processor (AP) configured to be in a reduced-activity—e.g., sleeping, dormant, or other lower-power—state unless, for example, it is woken up by the first stage 101. When woken up, the second stage 102 transitions to operating in an unrestricted-activity—e.g., full-power—mode. The second stage 102 then processes audio data corresponding to the keyword to confirm whether the received triggering audio data indeed includes the keyword. If confirmed, then the second stage 102 sends to the ASR stage 103 audio data corresponding to the keyword as well as some subsequent audio date that is expected to include a corresponding command for the ASR stage to decode and respond to.

For example, if the first stage 101 processes audio data corresponding to "That's great," "He is serious," and "Hey, Siri," where the keyword is "Hey, Siri," then the first stage 101 may wake up the second stage 102—and provide it the corresponding audio data—in response to "He is serious" and "Hey Siri," but not "That's great." The second stage 102 may, in turn, provide the audio data corresponding to "Hey, Siri," but not the others, to the ASR stage 103, together with subsequent audio data including a presumed command (e.g., "what time is it?"). The ASR stage 103 then itself confirms that the keyword was indeed included, parses the audio data corresponding to the presumed command, and performs a function in response to the command (e.g., providing the current local time).

The first stage 101 may, for example, use a Gaussian mixture model (GMM), a hidden Markov model (HMM), or a simple neural network as a keyword-detection model. The second stage 102 may, for example, use a deep neural network. The ASR stage may use one or more neural networks for the confirmation, parsing, and responding. Typically, the keyword-detection model used by the first stage 101 is factory programmed and subsequently remains unchanged. To the extent that the first stage 101 may be updated, updates may be provided by the manufacturer or another service provider in the form of a firmware over-the-air (FOTA) update.

Figure 2:
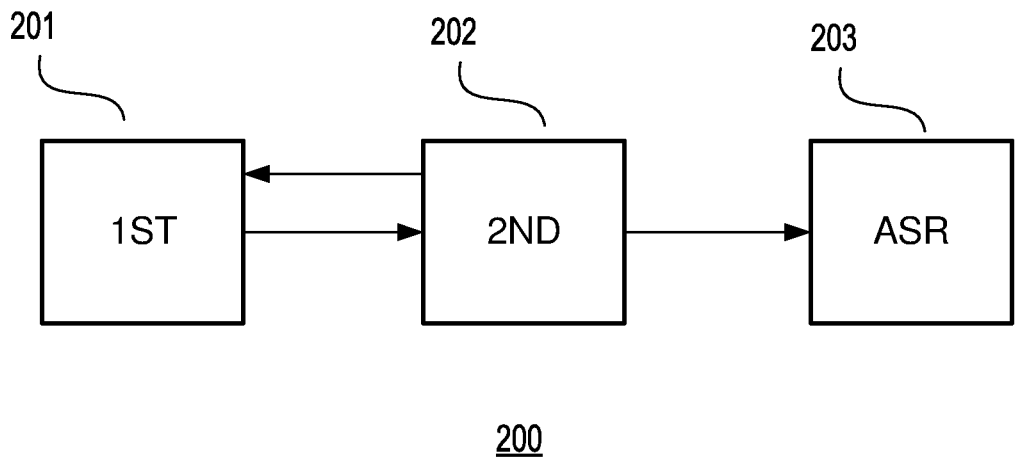
FIG. 2 is a schematic diagram for a two-stage wakeup system in accordance with an embodiment of disclosure.

FIG. 2 is a schematic diagram for a two-stage wakeup system 200 in accordance with an embodiment of the disclosure. The wakeup system 200 comprises a first stage 201, a second stage 202, and an ASR stage 203, which provide functionalities similar to those of the corresponding elements of system 100 of FIG. 1—respectively, the first stage 101, the second stage 102, and the ASR stage 103. Notably, however, the second stage 202 of system 200 is configured to provide feedback to the first stage 201 and the first stage 201 is configured to update its keyword-detection model based on the feedback received from the second stage 202. This feedback loop in the system 200 may be referred to as self training or self learning. This self training may reduce the false-alarm rate of the first stage 201, relative to the first stage 101 of system 100, while maintaining the same false-reject (or miss) rate.

It should be noted that the false-reject rate for the first stage 201 may be adjusted by adjusting a corresponding threshold value used by the first stage 201. Setting a lower false-reject rate increases one aspect of user satisfaction since then fewer actual keywords get ignored, but increases the false alarm rate and the overall power usage since the second stage 202 gets woken up more often, which may, for example, reduce device battery life, which may reduce another aspect of user satisfaction. It should be noted that the increased false alarm rate should not increase the rate of false alarms provided to the ASR stage 203 since the second stage 202 should correctly evaluate the false alarms received from the first stage 201 as not containing the keyword and, consequently, not forward any corresponding audio to the ASR stage 203, but may send training data to the first stage 201 for the first stage to update its keyword-detection model.

Self training may be performed in accordance with the following algorithm. The first stage is initiated with an initial keyword-detection model M, where a corresponding learning bin Q is initially empty. For every incoming keyword-detected unlabeled datum $u_i$, a user-score function generates a corresponding user score $s_i$. The score, $s_i$, is usually likelihood of a keyword given an input utterance, and is once calculated for each label $u_i$. If $s_i \geq t_1$, where $t_1$ is a detection-decision threshold, then the first stage wakes up the second stage, and $s_i$ is recalculated by the second stage. If the recalculated $s_i \geq t_2$, where $t_2$ is a learning threshold greater than $t_1$, then $u_i$ is appended into Q which is maintained by the first stage. The thresholds, $t_1$ and $t_2$, are pre-determined in training phase with distributions of scores, $s_i$ in the first and second stages. Note that, in some alternative implementations, threshold $t_2$ may be lower than or equal to threshold $t_1$. Also note that, in some alternative implementations, the learning bin Q is maintained by the second stage or another element other than the first stage. If the size of Q is greater than a self-training-start constant, then the model M is adjusted using the learning bin Q and set L of corresponding labeled data $l_i$.

Figure 3:
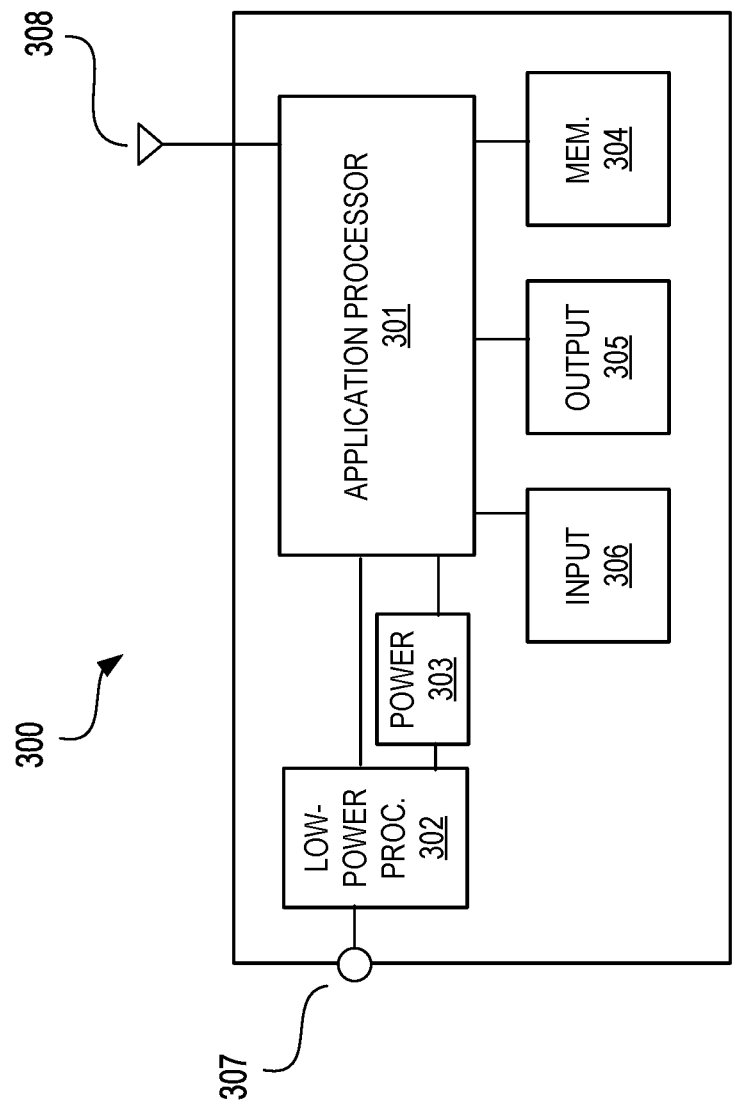
FIG. 3 is a simplified schematic diagram of an exemplary electronic device in accordance with some aspects of the disclosure, which may be used to implement the two-stage wakeup system of FIG. 2.

FIG. 3 is a simplified schematic diagram of an exemplary electronic device 300 in accordance with some aspects of the disclosure, which may be used to implement the two-stage wakeup system 200 of FIG. 2. The device 300, which may be a mobile device, comprises an application processor (AP) 301, a low-power processor 302, a power source 303, a memory 304, a user output 305, a user input 306, an antenna 308, and a microphone 307. The AP 301 may be a system on chip (SoC) processor. The AP 301 performs and/or controls many of the functions of the device 300 and is connected directly to the memory 304, the user output 305, the user input 306, the power source 303, the low-power processor 302, and the antenna 308. The low-power processor 302 may be a low-power digital signal processor (DSP) and may be connected to the microphone 307 and the power source 303. The low-power processor 302 is relatively low-power in comparison the AP 301. Specifically, the low-power processor 302 consumes less power than the AP 301 when both are operating. The memory 304 may be, for example, a DRAM. The power source 303 may be, for example, a battery. The user output 305 may, for example, comprise a display and/or a speaker. The user input 306 may comprise, for example, buttons, a keyboard, and/or a touch screen. A user-output display of output 305 may be fully or partially integrated with a touch-screen user input 306.

The device 300 may be used to partially implement a voice-based UI system. Specifically, the device 300 may implement the first stage 201 and second stage 202 of the system 200 of FIG. 2. The device 300, implementing a voice-based UI, may support a two-stage wake-up system with the low-power processor 302 implementing a first-stage wakeup function, the AP 301 implementing a second-stage confirmation function, and a remote (e.g., cloud-based) processor (not shown) implementing an automated speech recognition (ASR) function.

For the first stage, the AP 301 may be in a reduced-activity, e.g., sleep, mode, while the low-power processor 302 remains active and continuously processes streaming audio data generated from sound captured by the microphone 307 to determine if a keyword utterance may have been captured by the microphone 307. The microphone 307, the low-power processor 302, or an audio preprocessor (not shown) may process the raw waveform to generate a tensor comprising mel-frequency cepstral coefficients (MFCC) or log-mel spectrum data for processing by the low-power processor 302. Alternatively, the low-power processor 302 may process the raw waveform directly to determine whether it contains a keyword utterance, without first performing frequency processing. The raw waveform and/or a corresponding frequency-processed stream may be buffered for optional provision to the AP processor 301.

If the low-power processor 302 determines that a keyword utterance has been captured by the microphone 307, then the low-power processor 302 wakes up the AP 301 and provides it audio data corresponding to the triggering audio segment determined to include the keyword utterance. The audio data segment (or clip) may also include the presumed command that follows the keyword. This audio data segment may be, for example, in any suitable format, as describe elsewhere herein.

The AP 301 then processes the audio data segment to determine—and independently verify—whether the corresponding audio segment contained the keyword utterance. If so, then the AP 301 provides all or part of the audio data segment to the ASR system to interpret the command, formulate and provide a response, or take another suitable action. The AP 301 may communicate with the ASR via the antenna 308, which may provide any suitable form of communications connectivity (e.g., Bluetooth, Wi-Fi, cellular, satellite, etc.). The AP 301 may then provide a resulting response from the ASR by using the user output 305.

If the AP 301 determines that the corresponding audio segment did not contain the keyword utterance, then the AP 301 may provide training feedback to the low-power processor 302. Training feedback may be generated for every instance that the AP 301 determines that the corresponding audio segment did not contain the keyword utterance or only for instances where a measure of the instance exceeds a learning threshold. The training feedback may be provided immediately after being generated or may be buffered to be provided in batches once a sufficient number of training-feedback instances has accumulated. The training feedback may comprise, for example, text corresponding to a recognized utterance or just a flag indicating that an incorrect determination was made. This training feedback may prompt adjustments to a mean vector and/or a covariance matrix of a GMM or HMM used by the low-power processor 302. The adjustment may be such that, following the adjustment, the low-power processor 302 would provide the correct determination given the same audio-segment input. Note that, initially, the mean vector used by the low-power processor 302 may be set to zero and the covariance matrix may be set to the identity matrix.

This two-stage keyword-spotting system provides results similar to a one-stage system that runs on an application processor continuously, but the two-stage system uses much less power. In one exemplary implementation, if the AP 301 uses 100 mW when operating, but operates, on average, only 1% of the time (when woken up by the low-power processor 302), and the low-power processor 302 uses 4 mW and operates 100% of the time, then the average power usage for a two-stage system comprising both processors is 5 mW, which is much less (specifically, 95% less) than for a one-stage system that uses only AP 301 running continuously. This not only extends the utility of the power source 303, but also mitigates problems that might arise from heat generated by continuously running the AP 301.

If the low-power processor 302 is tuned so that it has a relatively high sensitivity to keywords (in other words, reducing the false-reject rate), then even if the low-power processor 302 provides relatively low accuracy by itself and excessively triggers false alarms, when working in concert with the AP 301, the combination provides accuracy similar to a system that continuously runs its applications processor since the more-accurate AP 301 will reject the false-alarm triggers and process the proper alarm triggers.

Figure 4:
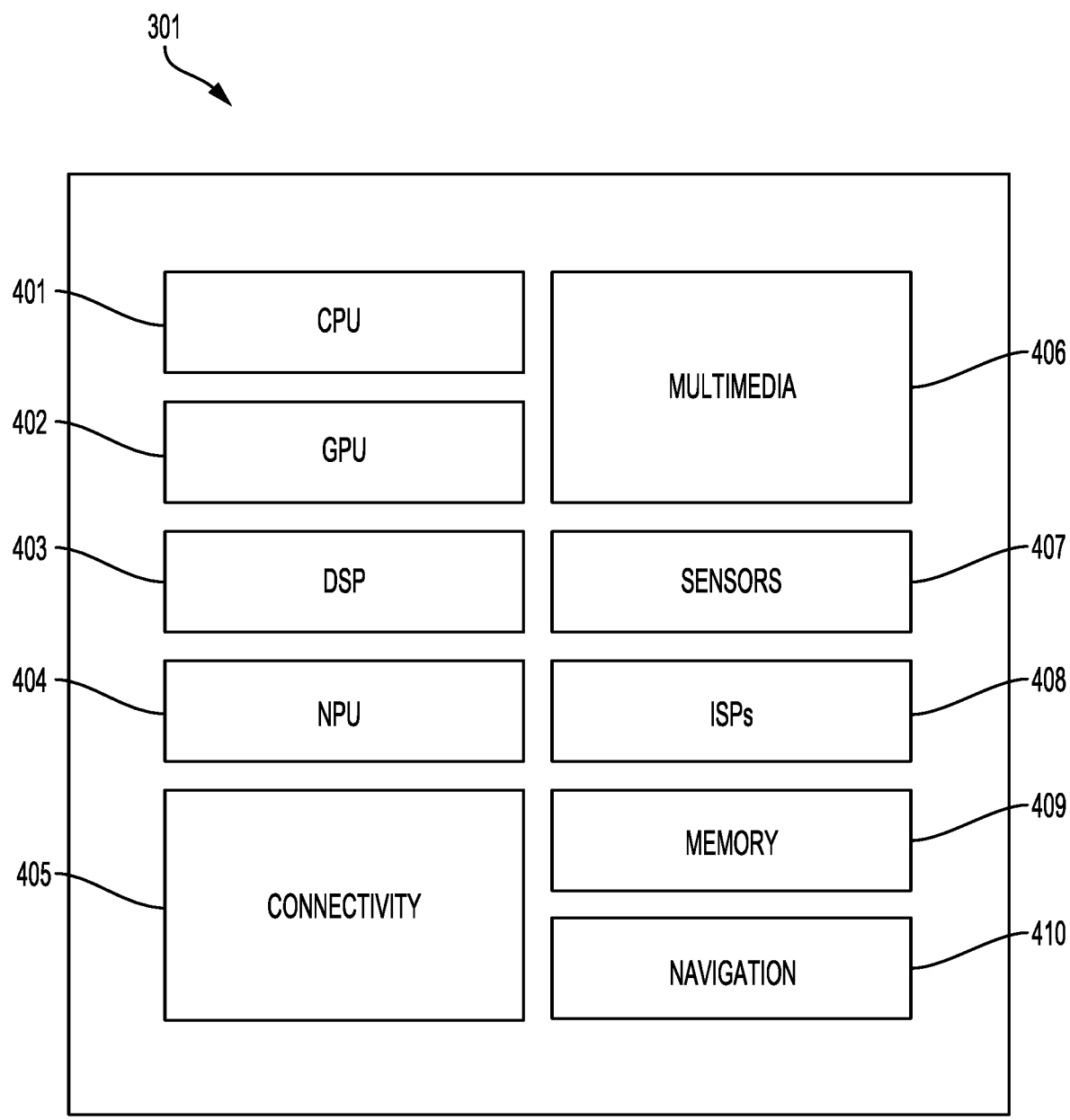
FIG. 4 is a schematic diagram of an exemplary implementation of the AP of FIG. 3.

FIG. 4 is a schematic diagram of an exemplary implementation of AP 301 of FIG. 3, which may be an SoC. The AP 301 comprises one or more of a central processing unit (CPU) 401 or a multi-core CPU, a graphics processing unit (GPU) 402, a digital signal processor (DSP) 403, a neural processing unit (NPU) 404, a connectivity block 405, a multimedia processor 406, a sensor processor 407, image signal processors (ISPs) 408, a memory block 409, and/or navigation module 410.

Data, instructions, system parameters, etc., may be stored in a memory block associated with the NPU 404, in a memory block associated with the CPU 401, in a memory block associated with the GPU 402, in a memory block associated with the DSP 403, in the memory block 409, or may be distributed across multiple blocks.

The connectivity block 405 may include cellular connectivity, Wi-Fi connectivity, USB connectivity, Bluetooth connectivity, and the like. The connectivity block 405 is connected to and controls the antenna 308. The NPU 404 may be used to implement a deep learning architecture to assist in speech recognition. In one implementation, the NPU is implemented in the CPU 401, DSP 403, and/or GPU 402. The navigation module 410 may include a global positioning system. One of more of the described modules may be configured to process input from user input 306 and microphone 307. One of more of the described modules may be configured to provide output to output 305. One or more of the described modules may be configured to read from and write to the memory 304.

The AP 301 and/or components thereof may be configured to perform voice-based UI operations according to aspects of the present disclosure discussed elsewhere. By using the systems and methods described, a computing device may provide voice-based UI more efficiently than conventional systems and methods.

Figure 5:
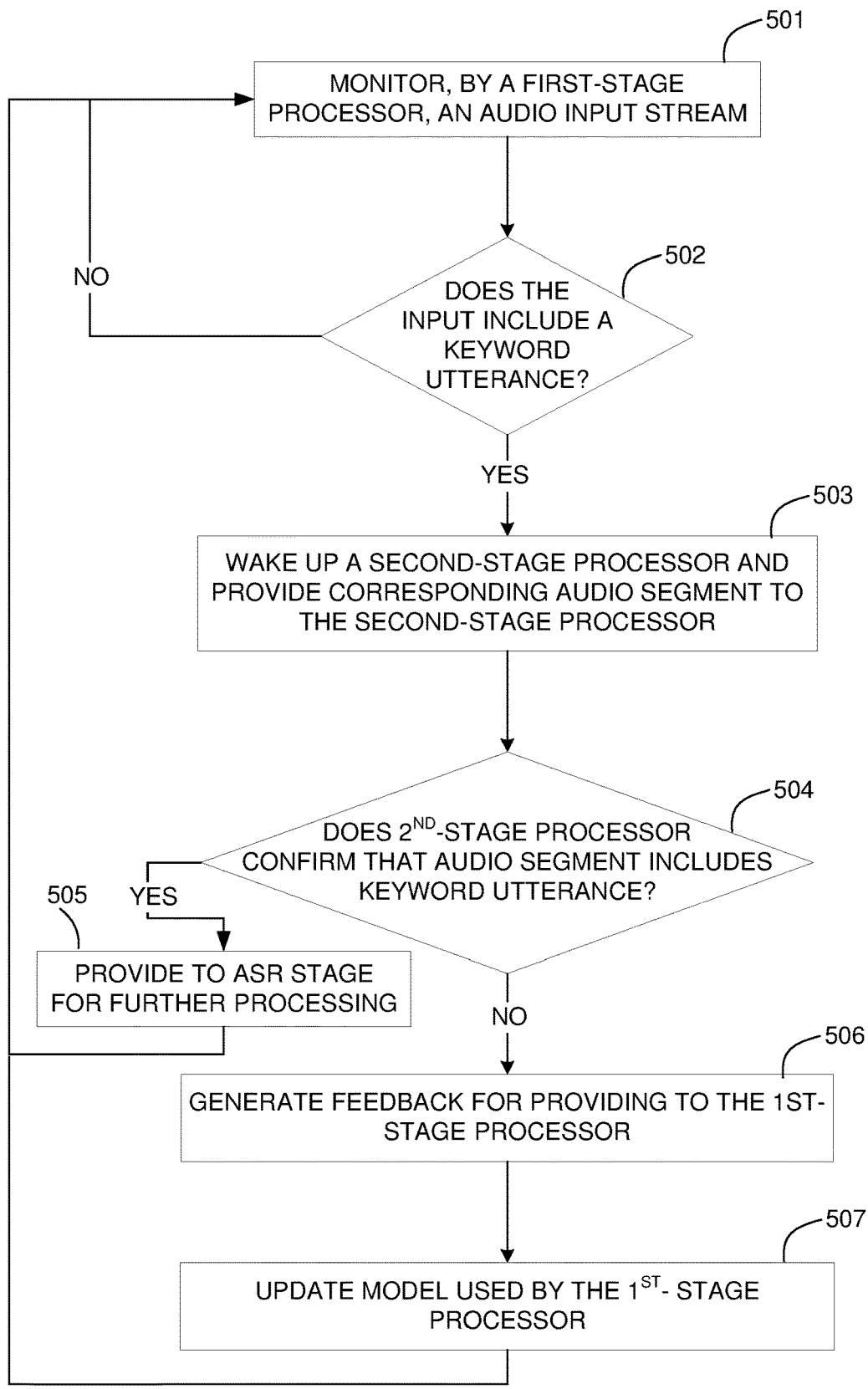
FIG. 5 is a flow chart of a process in accordance with an embodiment of the disclosure.

FIG. 5 is a flow chart of a process 500 in accordance with one embodiment of the disclosure. The process 500 starts with monitoring, by a first-stage processor, an audio input (step 501), which determines whether the input stream includes a keyword utterance (step 502). If the first-stage processor determines that the input includes the keyword (step 502), then it wakes up a second-stage processor and provides it a corresponding audio segment (step 503), otherwise, the first-stage processor continues monitoring the input audio stream (step 501). It should be noted that the first-stage processor may continue monitoring the audio input even if it determines that the input includes the keyword.

If the second-stage processor was woken up in step 503, then the second-stage processor determines whether the received audio segment includes the keyword utterance (step 504). If the second-stage processor confirms that the segment includes the keyword (step 504), then the second-stage processor provides the audio segment to an ASR stage for further processing (step 505) as described elsewhere herein. Otherwise (step 504), the second-stage processor optionally generates feedback for providing to the first-stage processor (step 506). As noted elsewhere, feedback might be generated only if a certain measure of the audio segment exceeds a learning threshold. Subsequently, the generated feedback is used to update the keyword-detection model used by the first-stage processor (step 507).

In some implementations of the device 300 of FIG. 3, where the power source 303 is a rechargeable battery, the provision of training feedback from the AP 301 to the low-power processor 302 may be delayed until the device 300 is being recharged—e.g., when the battery 303 is in a recharging mode—rather than being performed whenever training feedback is otherwise available. This helps extend the charged time provided by the power source 303. The postponed training may include storing in memory 304 the feedback (e.g., one or more recognized texts) and the corresponding one or more audio segment for provision to the low-power processor 302 during recharging.

In some embodiments of the system 200 of FIG. 2, more than two stages may be used to implement a multi-stage wakeup system, where any later stage can provide feedback to any earlier stage. For example, in a three-stage wakeup system, the third stage can provide feedback to both the first and second stages (while the second stage may continue to provide feedback to the first stage).

In some embodiments of the device 300, the AP 301 monitors the false-alarm rate of the low-power processor 302 and, if the false-alarm rate drops below a predetermined threshold, then the low-power processor 302 may be permitted to provide the keyword utterance and corresponding audio segment to the ASR segment without waking up the AP 301 to confirm the presence of the keyword utterance.

Although embodiments of the invention have been described in relation to voice-activated UIs, the invention is not so limited. Two-stage self-training systems may be employed in monitoring any suitable type of input stream in addition to or instead of an audio stream. For example, in alternative embodiments, the input stream may comprise visual, audio-visual, or other sensor (e.g., location, acceleration, temperature, barometric, etc.) data.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electronic device comprising:
a first processing device; and
a second processing device, wherein:
the first processing device is configured to:
use a keyword-detection model to determine if a segment of an input stream comprises a keyword;
wake up the second processing device in response to determining that the segment of the input stream comprises the keyword; and
train the keyword-detection model, without adjusting a keyword threshold of the first processing device, in response to receiving a training input from the second processing device; and
the second processing device is configured to:
use a first neural network to determine whether the segment of the input stream comprises the keyword; and
provide the training input to the first processing device in response to determining that the segment of the input stream does not comprise the keyword, wherein:
the first processing device is a low-power processor; and
the second processing device is a system on chip (SoC) configured to:
operate in a reduced-activity mode; and
transition from operating in the reduced-activity mode to operating in an unrestricted-activity mode upon wake-up by the first processing device.

2. The electronic device of claim 1, wherein using the keyword-detection model by the first processing device comprises:
generating a user score for the segment of the input stream;
determining that the segment of the input stream comprises the keyword if the user score exceeds the keyword threshold; and
determining that the segment of the input stream does not comprise the keyword if the user score is less than the keyword threshold.

3. The electronic device of claim 2, wherein:
using the first neural network by the second processing device comprises:
recalculating the user score for the segment of the input stream; and
appending a datum corresponding to the user score to a learning bin if the recalculated user score exceeds a learning threshold; and
modifying the keyword-detection model comprises using the learning bin.

4. The electronic device of claim 3, wherein the learning threshold is greater than the keyword threshold.

5. The electronic device of claim 1, wherein the electronic device comprises a battery configured to provide power to the first and second processing devices.

6. The electronic device of claim 5, wherein:
the battery is a rechargeable battery configured to be recharged in a recharging mode; and
the first processing device is further configured to delay modifying the keyword-detection model until the battery is in a recharging mode.

7. The electronic device of claim 1, wherein the second processing device is further configured to provide the segment of the input stream to an automatic speech-recognition (ASR) system if the second processing device determines that the segment of the input stream comprises the keyword.

8. The electronic device of claim 7, wherein:
the second processing device monitors a false-alarm rate of the first processing device; and
the first processing device is configured to, after achieving a predetermined false-alarm rate, subsequently bypass waking up the second processing device and provide the segment of the input stream to the ASR system without waking up the second processing device.

9. The electronic device of claim 1, wherein the first processing device is configured to train the keyword-detection model by adjusting one of a mean vector, a covariance matrix of Gaussian mixture model (GMM), and a hidden Markov model (HMM) used by the first processing device.

10. A method for an electronic device comprising a first processing device and a second processing device, the method comprising:
receiving, at the first processing device, an input stream;
using a keyword-detection model, by the first processing device, to determine if a segment of the input stream comprises a keyword;
waking up the second processing device, by the first processing device, in response to determining that the segment of the input stream comprises the keyword;
using a first neural network, by the second processing device, to determine whether the segment of the input stream comprises the keyword;
providing, by the second processing device, a training input to the first processing device in response to determining that the segment of the input stream does not comprise the keyword; and
training, by the first processing device, the keyword-detection model, without adjusting a keyword threshold of the first processing device, in response to receiving the training input, wherein:
the first processing device is a low-power processor;
the second processing device is a system on chip (SoC) configured to operate in a reduced-activity mode; and
the method further comprises the second processing device transitioning from operating in the reduced-activity mode to operating in an unrestricted-activity mode upon wake-up by the first processing device.

11. The method of claim 10, wherein using the keyword-detection model by the first processing device comprises:
generating a user score for the segment of the input stream;
determining that the segment of the input stream comprises the keyword if the user score exceeds the keyword threshold; and
determining that the segment of the input stream does not comprise the keyword if the user score is less than the keyword threshold.

12. The method of claim 11, wherein:
using the first neural network by the second processing device comprises:
recalculating the user score for the segment of the input stream; and
appending a datum corresponding to the user score to a learning bin if the recalculated user score exceeds a learning threshold; and
modifying the keyword-detection model comprises using the learning bin.

13. The method of claim 12, wherein the learning threshold is greater than the keyword threshold.

14. The method of claim 10, further comprising providing, by the second processing device, the segment of the input stream to an automatic speech-recognition (ASR)

system if the second processing device determines that the segment of the input stream comprises the keyword.

15. The method of claim 14, further comprising:
monitoring, by the second processing device, a false-alarm rate of the first processing device; and
after achieving a predetermined false-alarm rate by the first processing device, subsequently bypassing waking up the second processing device and providing the segment of the input stream to the ASR system without waking up the second processing device.

16. The method of claim 10, wherein:
the electronic device comprises a battery configured to provide power to the first and second processing devices;
the battery is a rechargeable battery configured to be recharged in a recharging mode; and
the method further comprises the first processing device delaying modifying the keyword-detection model until the battery is in a recharging mode.

17. The method of claim 10, wherein the training of the keyword-detection model comprise adjusting one of a mean vector, a covariance matrix of Gaussian mixture model (GMM), and a hidden Markov model (HMM) used by the first processing device.

18. A non-transitory computer-readable medium comprising instructions that, when executed by a first and second processing device, cause the first and second processing device to perform operations for:
receiving, at the first processing device, an input stream;
using a keyword-detection model, by the first processing device, to determine if a segment of the input stream comprises a keyword;
waking up the second processing device, by the first processing device, in response to determining that the segment of the input stream comprises the keyword;
using a first neural network, by the second processing device, to determine whether the segment of the input stream comprises the keyword;
providing, by the second processing device, a training input to the first processing device in response to determining that the segment of the input stream does not comprise the keyword; and
training, by the first processing device, the keyword-detection model, without adjusting a keyword threshold of the first processing device, in response to receiving the training input, wherein:
the first processing device is a low-power processor; and
the second processing device is a system on chip (SoC) configured to:
operate in a reduced-activity mode; and
transition from operating in the reduced-activity mode to operating in an unrestricted-activity mode upon wake-up by the first processing device.

* * * * *